United States Patent

[11] 3,573,635

[72] Inventor Donald J. Da Costa
Wappingers Falls, N.Y.
[21] Appl. No. 776,647
[22] Filed Nov. 18, 1968
[45] Patented Apr. 6, 1971
[73] Assignee International Business Machines Corporation
Armonk, N.Y.

[54] PULSE TRANSFER SYSTEM
5 Claims, 3 Drawing Figs.

[52] U.S. Cl. .......... 328/103, 307/208
[51] Int. Cl. .......... H03k 17/00
[50] Field of Search .......... 307/241, 208, 242, 244; 328/103, 152-154; 330/124; 179/170, 170(T)

[56] References Cited
UNITED STATES PATENTS 3,271,528 9/1966 Vallese .......... 307/230X

*Primary Examiner*—Roy Lake
*Assistant Examiner*—James B. Mullins
*Attorneys*—Hanifin and Jancin and James E. Murray

ABSTRACT: Two groups of terminals are interconnected by circuitry which transfers a pulse from any one terminal of the first group to all terminals of the second group and vice versa. Each terminal is connected to a common transfer system through an individual amplifier circuit which permits simultaneous bidirectional pulse transfers. The amplifiers are arranged to inhibit transfers of signals from one terminal of a group to the remaining terminals of the same group.

Patented April 6, 1971 3,573,635

2 Sheets-Sheet 1

INVENTOR
DONALD J. Da COSTA

BY James E. Murray

ATTORNEY

PULSE TRANSFER SYSTEM

BACKGROUND OF THE INVENTION

1. Field of the Invention

The invention relates to pulse transfer arrangements for use in data processing and communication systems. In particular, the invention relates to a pulse transfer system which has bidirectional pulse transfer capabilities.

2. Prior Art

The design of complex data-processing systems and communication networks has always raised problems in connection with the construction and layout of interconnection wiring. However, in the past few years, with increasing speed of data-processing systems and increasing frequencies used in communication systems, especially in pulse transmission systems, these problems have become more important. In data-processing systems in particular two undesirable factors increase with increases in speed. The first is generated noise, and the second is pulse propagation delay. Both of these can cause errors in data as it is transferred between the components of a system.

The problems of both noise and delay can be reduced by the use of wiring designed upon radio transmission line principles, but this is costly. To reduce this cost, and also to reduce maintenance efforts, bidirectional amplifiers have been used, particularly in telephone repeater circuits. Though such arrangements reduce interconnection wiring, it is desirable, when practicable, to further reduce such wiring.

Accordingly, it is an object of the invention to minimize wiring between terminals of a pulse transfer system.

It is a further object of the invention to provide a system which has both bidirectional pulse transfer and pulse distribution capabilities.

SUMMARY OF THE INVENTION

In accordance with one aspect of the invention, two groups of amplifiers are provided. Each amplifier has a common input/output terminal, an input lead and an output lead. Every amplifier is arranged to pass pulses from its common input/output terminal to its output lead, and from its input lead to its common input/output lead. The output leads of each group of amplifiers are connected, through transfer lines to all input leads of the other group. Pulses applied to any common input/output terminal of an amplifier in one group are transferred to all common input/output terminals of the other group. Each amplifier inhibits the transfer of pulses from its output lead to its common input/output terminal.

The subject system has particular utility in pulse distribution systems in which, for example, a timing signal from one of a number of sources is transmitted to a number of destinations simultaneously. The system may also be used in backup storage arrangements in which digital data signals are transmitted from a source to both a processing unit and a backup store, and may be later returned to the source from either the store or the processing unit.

BRIEF DESCRIPTION OF THE DRAWINGS

The above and other objects of the invention will become more apparent from the following description of a preferred embodiment thereof, and reference will be made to the accompanying drawings, in which.

GENERAL DESCRIPTION

Figure 1:
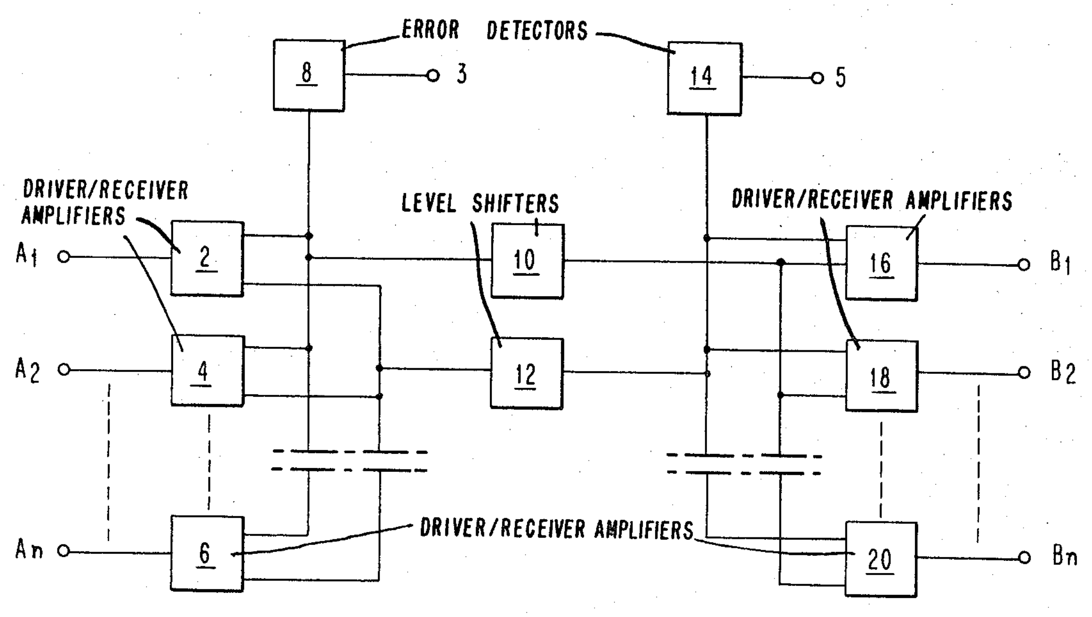
FIG. 1 is a block diagram which illustrates the general arrangement of a pulse transfer system in accordance with the invention.

Referring to FIG. 1, there is shown therein a system which includes a first group of terminals $A_1$ through $A_n$. Each of these terminals is connected into the system via one of a set of driver/receiver amplifiers (hereinafter referred to as DR circuits) 2, 4 and 6. Though three terminals and DR circuits have been shown, any number may be provided. This is indicated by the dotted lines between terminals $A_2$ and $A_n$ and DR circuits 4 and 6. Alternatively, the group may be replaced by a single terminal/DR circuit combination, such an arrangement will be discussed more fully later. The DR circuits 4 through 6 each have output leads which are connected in common to an error detection circuit 8. This has an output terminal 3 which is connected to receive error indication signals generated by circuit 8. The above-mentioned output leads from DR circuits 2 through 6 are also connected in common to the input of a level shifting circuit 10, the output of which is connected to the input leads of a further group of DR circuits 16 through 18. Again, though a group of three DR circuits has been shown, there may be more circuits in this group, as is indicated by the dotted line between circuits 18 and 10. Each of the circuits 16 through 20 is connected to one of a group of terminals $B_1$ through $B_n$, and each has an output lead. These output leads are connected in common to an error detection circuit 14, which has an output terminal 5. The commoned output leads are also connected, through a level-shifting circuit 12, to input leads of DR circuits 2 through 6.

GENERAL OPERATION

In operation, a signal applied, for example, to terminal $A_1$ causes the generation of a signal on the output lead of DR circuit 2. This signal is then applied, through level shifter 10 to the input leads of DR circuits 16 through 20. In response to this input, these DR circuits generate output signals at terminals $B_1$ through $B_n$. Similarly, input signals applied to any one terminals $B_1$ through $B_n$ cause the generation of output signals on all terminals $A_1$ through $A_n$.

The error detection circuits 8 and 14 are responsive to the level of signals on the respective commoned output leads of the groups of DR circuits. When this level changes by an abnormal amount, due to the presence of two input signals at one set of terminals (for example, on both terminals $A_1$ and $A_2$), the corresponding error detection circuit is activated to generate an error indication signal.

The DR circuits are arranged for simultaneous bidirectional transfer of signals therethrough. Thus, a signal from terminal $A_1$ may be generating corresponding output signals at terminals $B_1$ through $B_n$ while at the same time a signal from terminal $B_1$ is generating output signals at the $A_1$ through $A_n$ terminal set. This set, of course, includes terminal $A_1$, so both input and output signals appear simultaneously at this terminal. This situation will be understood more clearly from the description of the system waveforms which follows later.

Lastly, with reference to FIG. 1, the configuration of the DR circuits is such that an output signal from one in a group of the commoned output lines is ineffective to cause output signals on any of the terminals connected to the other DR circuits of the same group. Thus, for example, an input signal applied to terminal $A_2$ causes the generation of output signals at terminals $B_1$ through $B_n$ but not at terminals $A_1$ and $A_n$. The following description of FIG. 2 will bring out this feature more clearly.

DETAILED DESCRIPTION

Figure 2:
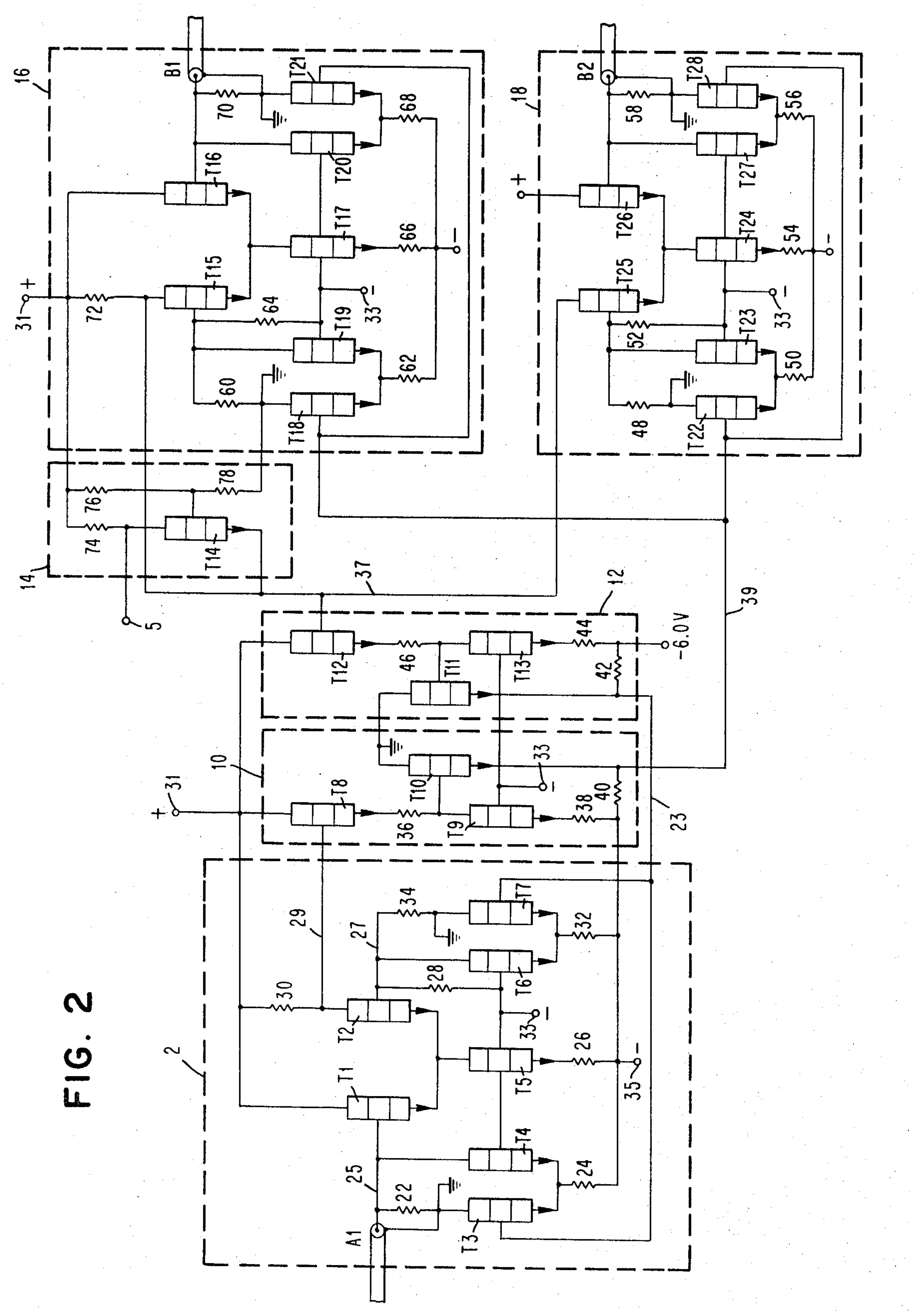
FIG. 2 shows, in greater detail, a system similar to that shown in FIG. 1 with certain parts omitted for clarity.

FIG. 2 is a schematic diagram of a system similar to that shown in FIG. 1 but which has certain units omitted for clarity. Broken lines box in those portions of the circuit corresponding to the parts of FIG. 1 which are included. These are, three DR circuits 2, 16 and 18, the two level-shifting circuits 10 and 12, and error detection circuit 14.

The basic building blocks of the system are the DR circuits, for example DR circuit 2. The circuit comprises three differential amplifiers. The first of these amplifiers comprises transistors T3 and T4, which have a shared emitter resistor 24, and includes a load resistor 22 connected to the collector of transistor T4. The amplifier has an input lead connected to the base of transistor T3, and is arranged to apply output signals to a lead 25. The second differential amplifier comprises transistors T6 and T7 which have a common emitter resistor 32. Transistor T6 has a load resistor 34 connected to its collector and a resistor 28 connected between its base and collector. This circuit receives input signals from lead 23 at the base of transistor T7 and produces output signals on lead 27. The third differential amplifier comprises transistors T1 and T2 which have, in their common emitter circuit, a transistor T5 and resistor 26. These latter components act as a constant current source. Transistor T2 has a load resistor 30 in its collector circuit. The amplifier is arranged to receive input signals from leads 25 and 27 at the bases of transistors T1 and T2, and to apply output signals from the collector of transistor T2 to a lead 29. Suitable power and bias supplies are applied to the circuit through terminals 31, 33 and 35, with polarities as shown.

When DR circuit 2 is in its quiescent state, transistors T2, T4 and T6 are in a nonconducting condition and transistors T1, T3 and T7 conduct. Transistor T5, as a constant current generator, conducts during both quiescent and active states of the DR circuit.

A negative input signal applied to terminal $A_1$ cuts off transistor T1. This causes T2 to switch to a conducting condition, as the constant current from transistor T5 is directed from transistor T1 into transistor T2. A negative-going output signal is therefore generated on output line 29.

If, when DR circuit 2 is in its quiescent state, a negative input signal is applied over line 23, transistors T7 and T3 are thereby switched from their conducting condition to a nonconducting condition. When transistor T3 switches OFF, it causes transistor T4 to conduct by virtue of the common collector resistor 24. A negative-going output signal is thereby applied to terminal $A_1$ over lead 25. This signal is also directed to the base of transistor T1. However, as transistor T7 has been switched to its OFF condition, and, therefore, transistor T6 is switched to a conducting condition, a similar negative-going output signal is applied to the base of transistor T2. As both transistors T1 and T2 receive substantially identical signals from transistors T4 and T6 in response to an input from lead 23, these signals are not effective to change the state of the differential amplifier (comprising transistors T1, T2 and T5) in view of the common mode rejection property of such amplifiers.

It should be noted here that input signals may appear simultaneously at both terminal $A_1$ and lead 23. When this happens, the voltage at terminal $A_1$ is the sum of the input signal applied thereto and the output signal from transistor T4. This will be understood more clearly from the discussion of waveforms which follows later.

DR circuit 16, which comprises transistors T15 through T21 and resistors 60, 62, 64, 66, 68, 70 and 72, and DR circuit 18, which comprises transistors T22 through T28 and resistors 48, 50, 52, 54, 56, 58 and 72, are substantially identical, both in construction and operation, to each other and to DR circuit 2. They differ from DR circuit 2 in that they both share a common load resistor 72, which is in the collector lead of transistors T15 (DR circuit 16) and T25 (DR circuit 18). They also share a common output lead 37. Thus input signals applied to either terminal $B_1$ or terminal $B_2$ cause output signals to appear on lead 37. An output signal on lead 37 will, of course, appear on the collectors of both transistors T15 and T25. The input impedance at these collectors is sufficiently high to isolate the remaining circuitry of, for example, DR circuit 18 from an output signal from DR circuit 16 on line 37. Thus, each of the DR circuits 16 and 18 inhibits the transfer of signals from the terminal of the other circuit to its own terminal.

Level-shifting network 10 routes output signals from lead 29 of DR circuit 2 to the input lead 39 of DR circuits 16 and 18. It comprises transistors T8, T9 and T10 and resistors 36, 38 and 40. Transistor T9 and resistor 38 form a constant current generator which is connected in series with resistor 36 and transistor T8. This series combination acts to reduce the DC level of signals from lead 29 as they are applied to the base of transistor T10. This transistor, and its emitter resistor 40, form an emitter follower circuit which provides a low impedance output on lead 39. Thus, level shifter 10 performs two functions. First, it reduces the DC level of signals at lead 29 to a value suitable for application to the bases of the input transistors T18, T21 and T22, T28 of DR circuits 16 and 18. Second, it presents a low impedance on line 39 so that this line can serve more than one DR circuit without significant attention of signals.

Level-shifting network 12 is identical in construction and operation to network 19, its function is to pass output signals on lead 37 to input lead 23 of DR circuit 2.

Error detection circuit 14 comprises a transistor T14 which has a collector load resistor 74. The base of transistor T14 is biased by a network comprising resistors 76 and 78, and its emitter is connected to the collectors of transistors T15 and T25 via lead 37. When both DR circuits 16 and 18 are quiescent, or when one only of these circuits is receiving an input signal at terminal $B_1$ or $B_2$, T14 remains cut off as its emitter voltage does not fall sufficiently to overcome the base bias. However, if input signals are applied to terminals $B_1$ and $B_2$ simultaneously, both transistors T15 and T25 conduct, and the potential on line 37 becomes sufficiently low to cause transistor T14 to conduct. A negative-going output signal will then appear on terminal 5. It should be noted that an error signal will be generated when signals applied to terminals $B_1$ and $B_2$ do not fully overlap. If any portions of such signals overlap, an error signal will be generated only during the period of overlap.

OPERATION OF DETAILED DESCRIPTION

Recapitulating, the system operates to transfer signals from terminal $A_1$ to terminals $B_1$ and $B_2$, or from either terminals $b_1$ or $B_2$ to terminal $A_1$. A signal from terminal $A_1$ generates an output signal on line 29, this is passed through level shifter 10 to appear on lead 39 which is the input lead for DR circuits 16 and 18. A signal from either terminal $B_1$ or terminal $B_2$ generates an output signal on line 37, this is passed through level shifting circuit 12 to appear as an input to DR circuit 2 on lead 23. If input signals at terminals $B_1$ and $B_2$ overlap, an error signal is generated by circuit 14.

Though the system shown in FIG. 2 is within the scope of the invention, it is, as has been mentioned above, a simplified version of the system shown in FIG. 1. Referring to both FIGS., further DR circuits, for example circuits 4 and 6, may be connected to form a group with DR circuit 2 by connecting their output leads to lead 29 of DR circuit 2. Each of these extra DR circuits is similar to DR circuit 18, which has no self-contained output load resistor. With this arrangement, resistor 30 of DR circuit 2 forms the common load resistor for the whole group. Error detector circuit 8, which is identical to error detector circuit 14, may then be connected to output lead 29. Further DR circuits, for example circuit 20, may be added to the right-hand group by connecting their output leads to lead 37. Again, these circuits will have no self-contained output load resistors, and will share resistor 72.

Figure 3:
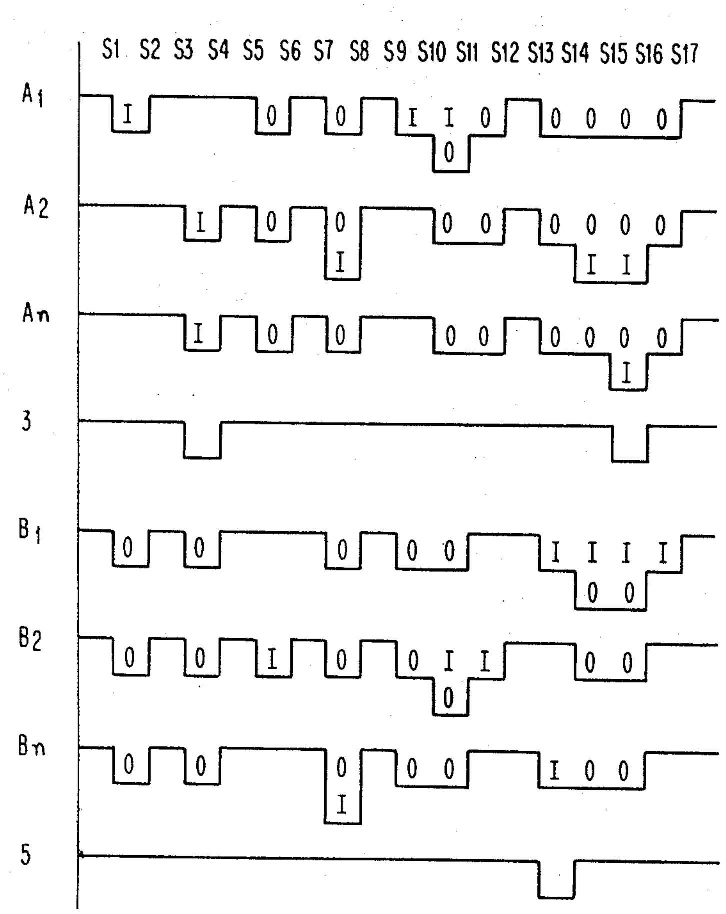
FIG. 3 is a waveform diagram showing idealized versions of input and output signals for the system shown in FIG. 1.

FIG. 3 shows examples of waveforms which may occur in a system in accordance with the invention, and in particular in a system which employs two groups of input terminals and two error detection circuits. Each line indicates the voltage at one of the terminals of FIG. 1, and each signal is labeled either 1, which represents an input signal, 0 which represents an output signal, or both 1 and 0, which represents the presence of both an input and output signal. The terminal numbering corresponds to that shown in FIG. 1.

Between times S1 and S2, an input signal is applied to terminal $A_1$, this generates output signals on terminals $B_1$, $B_2$ and $B_n$.

Between times S3 and S4, input signals are applied to terminals $A_2$ and $A_n$, these signals cause output signals to appear at terminals $B_1$, $B_2$ and $B_n$, but these output signals are invalidated by an error signal at terminal 3.

Between times S5 and S6, an input signal at terminal $B_2$ causes output signals to be generated at terminals $A_1$, $A_2$ and $A_n$.

Between times S7 and S8, input signals are applied to terminals $A_2$ and $B_n$. The former causes output signals on terminals $B_1$, $B_2$ and $B_n$, and the latter provides output signals on terminals $A_1$, $A_2$ and $A_n$. Double height signals exist at both terminals $A_2$ and $B_n$, indicating that each is receiving both input and output signals.

Between times S9 and S12, longer overlapping signals are shown. An input signal is applied to terminal $A_1$, between times S9 and S11, and a further signal to terminal $B_2$ between times S10 and S12. Output signals appear at the corresponding terminals, but there is no invalidation as no two input signals are applied to different terminals of the same group at one time.

Finally, between times S13 and S17, a single, extended input pulse is applied to terminal $B_1$. This causes the generation of output pulses at terminals $A_1$, $A_2$ and $A_n$ throughout the period. In the first portion of the period, however, an input pulse is applied to terminal $B_n$. This, as it overlaps the $B_1$ terminal input pulse, causes invalidation which is indicated by a pulse from terminal 5. During the second portion, i.e., from time S14 to S15, an input pulse is received on terminal $A_2$. This doubles the height of the signal at terminal $A_2$ and also provides output signals on the $B_1$, $B_2$ and $B_n$ terminals. At time S15 to S16, a further input pulse is applied to terminal $A_n$. This has no effect on the $B_1$, $B_2$ and $B_n$ terminals, but it causes an invalidation signal to occur at terminal 3. In the fourth period, i.e., from S16 to S17, the signals return to the original state at time S13.

It is emphasized that the signal states described with reference to FIG. 3 are merely examples of the many combinations, both valid and invalid which can exist within the system.

Though, in the above description, signal transfer between only two sets of terminals has been set out, it is clear that further terminal groups may be added. For example, a further group, connected to its own DR circuits which have a common level shifting circuit and error detection circuit, may be coupled to DR circuits 16, 18 and 20. The output lead from the level-shifting circuit would then be connected to the common input lead of DR circuits 16, 18 and 20, and their common output lead would be connected to the input of the new level-shifting circuit. Thus, terminals $B_1$, $B_2$ and $B_n$ would communicate both with the $A_1$, $A_2$ and $A_n$ group as well as the further terminal group. In a similar manner, other terminal groups or single terminals (as shown in FIG. 2) could be introduced into the system to form a complex network which has, however, the advantage of a minimized number of interconnecting leads between the terminals.

While the invention has been particularly shown and described with reference to a preferred embodiment thereof, it will be understood by those skilled in the art that various changes in the form and details may be made therein without departing from the spirit and scope of the invention.

I claim:

1. A pulse transfer system comprising:

a plurality of amplifiers, each said amplifier including a common input/output terminal, a first input lead, a first output lead, means for generating an output signal on said first output lead in response to an input signal on said common input/output terminal, means for generating an output signal on said common input/output terminal in response to an input signal on said first input lead, and means for inhibiting the transfer of pulses from said first output lead to said common input/output terminal;

first means connecting all of said first output leads of a first group of the amplifiers to all of said first input leads of a second group of the amplifiers; and second means connecting all of said first output leads of said second group of the amplifiers to all of said first input leads of said first group of the amplifiers;

whereby an input pulse applied to a common input/output terminal of one group of amplifiers causes the generation of output pulses on all common input/output terminals of the other group of amplifiers.

2. A pulse transfer system as claimed in claim 1 wherein:

said first output leads of said first group of the amplifiers are connected to said first input leads of said second group of the amplifiers through a first single transfer lead; and said first output leads of said second group of the amplifiers are connected to said first input leads of said first group of the amplifiers through a second single transfer lead.

3. A pulse transfer system as claimed in claim 1 in which each said amplifier is a bidirectional amplifier capable of transferring signals from said common input/output terminal to said first output lead and from said first input lead to said common input/output terminal simultaneously.

4. A pulse transfer system as claimed in claim 2 in which each said amplifier is a bidirectional amplifier capable of transferring signals from said common input/output terminal to said first output lead and from said first input lead to said common input/output terminal simultaneously.

5. A pulse transfer system as claimed in claim 1 including error detection means connected to said first output leads, said error detection means including means for generating an error indication signal in response to the simultaneous reception of input pulses by more than one common input/output terminal of the amplifiers in a group.